Nov. 28, 1933.  M. KLEIN  1,937,231
COMBINATION LIQUID LEVEL AND PRESSURE GAUGE
Filed April 16, 1931
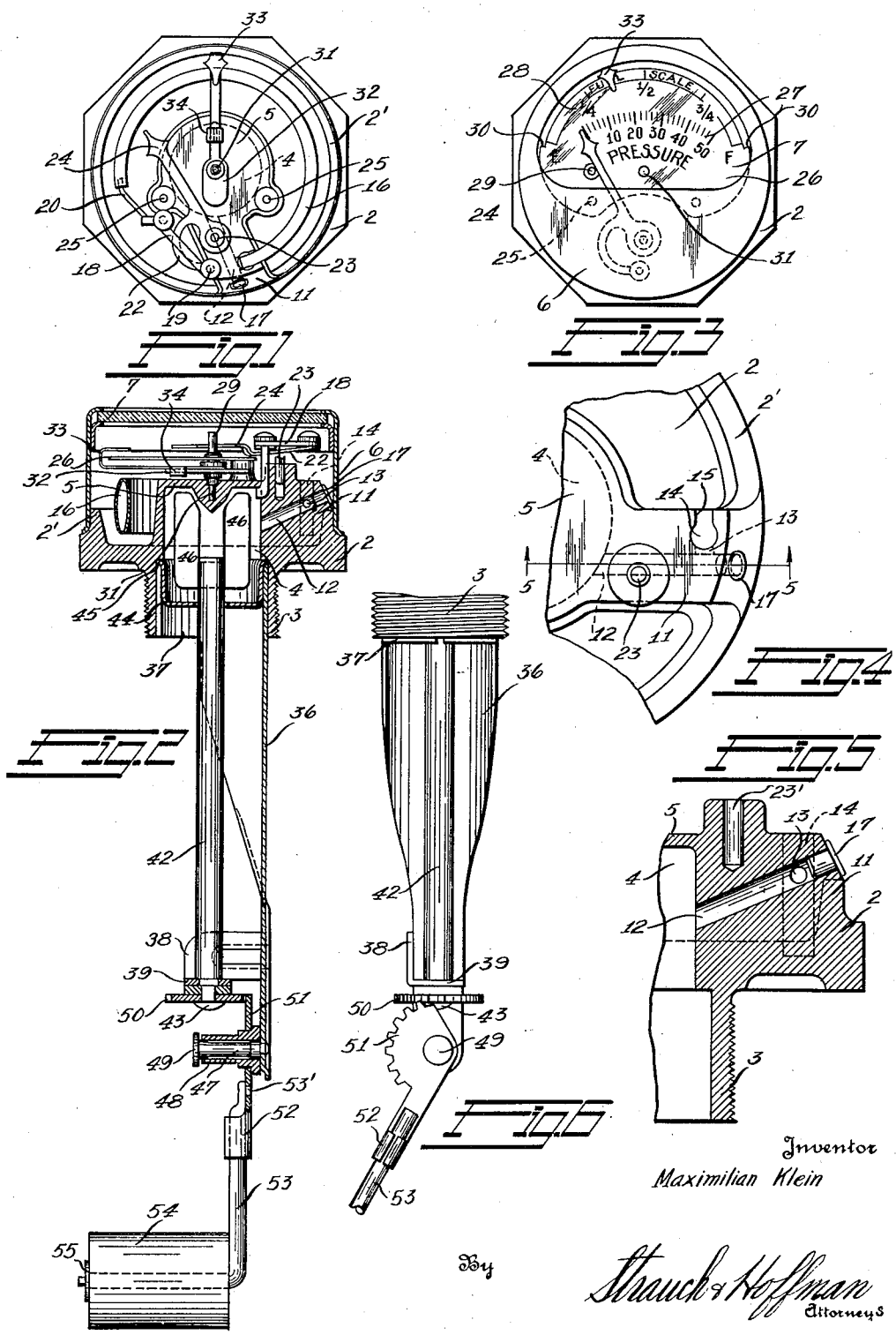
Inventor
Maximilian Klein
By Strauch & Hoffman
Attorneys Patented Nov. 28, 1933

1,937,231

UNITED STATES PATENT OFFICE 1,937,231

COMBINATION LIQUID LEVEL AND PRESSURE GAUGE

Maximilian Klein, Sellersville, Pa., assignor to United States Gauge Company, New York, N. Y., a corporation of Pennsylvania Application April 16, 1931. Serial No. 530,698

4 Claims. (Cl. 73—82)

This invention relates to a unitary combined instrument for indicating the level of liquid in a container and the pressure thereof.

In many installations, particularly where liquid fuel is fed by applied pressure from a tank to a burner or stove, it is very desirable to be able to read the quantity of liquid in the container and the pressure thereon. In prior installations it has been the usual practice to provide a pressure gauge and a separate liquid level gauge, thus requiring two separate liquid-tight and air-tight openings in the tank or container.

One object of this invention therefore is to provide a unitary instrument for association with a liquid container or tank whereby the liquid level and the pressure on the liquid may be read from the same instrument.

Another object of this invention is to provide an instrument of the above indicated character which is adapted to be attached to a liquid container or tank by way of a single opening of the same size as that usually afforded for the reception of a pressure gauge or a separate liquid level gauge.

Another object of this invention is to provide a combined liquid level and pressure gauge embodying a float operated shaft carrying a magnet in cooperation with a magnetic indicator mechanism, the indicator mechanism and the magnet being physically separated whereby any possible leakage of liquid around the float operated shaft is avoided, but the parts being closely related whereby the magnetic flux is concentrated adjacent the indicator to cause accurate movements thereof.

Another object of this invention is to provide a novel combined pressure gauge and liquid level gauge, the liquid level indicator being operated by the position of a magnet, and wherein the magnet is positioned closely adjacent to the indicator mechanism and the pressure indicating parts are positioned out of the magnetic field. By the particular construction of the novel casing as hereinafter disclosed, the magnetic coupling between the magnet and the indicator is extremely accurate and positive and no extraneous parts of the pressure gauge are interposed in the flux path to interfere with the operation of the liquid level gauge.

Another object of this invention is to provide a neat, accurate, and compact liquid level and pressure gauge wherein two indicator hands cooperate with a single dial, the operating mechanisms therefor being arranged beneath the dial in nested association whereby each operates independently of the other without interference.

Another object of this invention is to provide a liquid level and pressure gauge wherein the indicator hands for the pressure and liquid level operate upon a concentric dial, the pressure gauge being operated by a Bourdon tube and the level gauge being operated by a magnetic device, the magnetic device being nested within the Bourdon tube and compactly arranged in a single casing so that there is no interference with their independent operation.

Another object of this invention is to provide a supporting bracket for the float and the float operated shaft of a combined liquid level and pressure gauge, wherein the bracket is simply and readily attached to the casing head carrying the indicating mechanisms.

Another object of this invention is to provide a special casing adapted to receive a Bourdon tube for pressure indication and a magnetically operated level indicator, and so arranged that the float operated magnet is positioned in close juxtaposition to a pick-up armature for indicating the level of the liquid, the casing being greatly simplified in construction and assembly.

These and other objects of the invention will be apparent from the following description and claims, taken in connection with the accompanying drawing, wherein Figure 1 is a top plan view of the instrument with the upper portion of the casing removed.

Figure 2 is a central sectional view showing the complete instrument with the float operated shaft and bracket attached thereto.

Figure 3 is a top plan of the assembled instrument.

Figure 4 is enlarged detail of a portion of the casing.

Figure 5 is a section taken substantially on line 5—5 of Figure 4.

Figure 6 is a broken elevation taken at right angles to Figure 2, showing the float supporting bracket and mounting.

The indicating portion of the novel instrument is mounted in a casing or head 2, formed of some non-magnetic material, preferably being made as a brass forging. The head 2 is shaped to receive a wrench whereby the same may be readily attached to and detached from the liquid containing tank or receptacle, a depending central sleeve 3 being provided with external screw-threads for attachment to a tank. The head 2 is provided with a central well extending upwardly and in alignment with the sleeve 3, said well 4 terminating in an upper imperforate wall 5. The wall 5 has a slight enlargement projecting downwardly into the well, for providing a bearing for a shaft to be hereinafter described.

The visible portion of the indicating mechanism is adapted to be mounted on the upper surface of the head 2, and is enclosed by a frictionally retained cover member 6, which is seated upon a shoulder of an upwardly extending flange 2' as seen in Figure 2. The cover 6 is provided with an arcuate opening through which the pressure and volume hands may be seen. This opening is preferably closed by a glass or mica member 7 secured to the cover 6.

As seen more clearly in Figure 2, the casing 2 is so formed that a circular channel is provided between the reduced portion 2' upon which the cover 6 is secured and the central well 4. Formed preferably integral with the well 4 and extending to one side thereof is the boss 11. This boss 11 extends between and connects the well 4 and the flange 2'. As seen in Figure 1, the boss 11 is slightly wider at the bottom thereof than at the top, both sides sloping downwardly from the top and the end also being cut at an angle.

In order to provide communication to the pressure indicating mechanism contained within the casing formed by the head 2 and the cover 6, the boss 11 is provided with a passageway 12 extending diagonally therethrough and communicating with the well 4. The boss 11 is further provided with a cross pasageway 13 communicating with the passageway 12 and extending to one side of the boss 11. The boss 11 has a further drilled opening or passageway 14 extending vertically down the side wall thereof and intercepting the cross passageway 13, the wall of the boss 11 then being cut away as seen at 15 in Figure 4 to provide a vertically extending slot in the side wall thereof. The passageways above described are preferably drilled through the boss 11 and are thus simply and expeditiously cut in proper position, although it will be understood that these passageways may be otherwise formed.

In the slot 15, the open end of a Bourdon tube 16 is slipped so that the central passageway or opening in said Bourdon tube communicates with the cross passageway 13 and then by way of passageway 12 to the well 4. The Bourdon tube 16 is coiled around the central well 4 and is secured in the slot 15 by soldering, brazing, or any other suitable means to secure a fluid and air tight joint. By the above described construction it will be apparent that the Bourdon tube is placed in direct communication by way of passageways 14, 13, and 12 with the open well 4, whereby pressure on the fluid within the container with which the instrument is associated may be directly communicated to the Bourdon tube.

The end of the passageway 12 is preferably closed by a plug member 17 which is forced into the end thereof and is then preferably soldered or brazed in position to form a tight joint. That is, the only opening from the receptacle into the casing leads directly into the Bourdon tube 16, and the entrance of fluid or air to the remainder of the casing is prevented. The Bourdon tube 16 has secured thereto a link 20 to which is pivotally connected a strap 18. The opposite end of strap 18 is pivoted at 19 to an indicator carrying arm 22. The arm 22 is of arcuate shape as seen in Figure 1, and is pivoted to a post 23 mounted in an opening 23' in the upper surface of the boss 11. The indicating hand 24 integral with the arm 22 extends outwardly for cooperation with a scale. As the pressure is applied to the Bourdon tube 16, the link 20 moves outwardly thus pulling the strap 18 and the arm 22 to rotate the indicating hand 24 about the pivotal connection 23 in accordance with the pressure in the tank to which the gauge is attached.

The well 4 is provided with two upstanding rivets 25 to which a plate 26 is secured having two indicating scales thereon, the inner scale 27 being divided into divisions of pressure, and the outer scale 28 being divided into divisions indicating the quantity of liquid in the container. The indicating hand 24 projects over the plate 26 and into cooperative position with respect to the scale 27. The scale carrying plate 26 has a stop 29 projecting upwardly thereon for engagement when the pressure hand is at its zero position.

As previously explained, the upper imperforate wall 5 of the well 4 is provided with a central enlargement in which is positioned the vertical rod 31. Pivotally mounted on rod 31 is a magnetic bar 32, one end of said bar being larger in cross-section than the opposite end, as seen in Figure 1. An indicating hand 33 preferably of light non-magnetic material such as aluminum is also pivoted to the rod 31 and is secured to the magnetic vane 32 by flanges 34 bent around the bar 32. The outer end of the indicating hand 33 extends beyond the arcuate edge of the plate 26 into cooperative relation with the outer scale 28 thereon. The magnetic bar 32 is made larger at one end thereof to compensate for the additional weight of the indicating hand 33, whereby the bar 32 and the hand 33 are nicely balanced and move freely about the pivot 31. The scale plate 26 has its outer arcuate edge notched to provide stop shoulders 30 just beyond the "full" and zero positions of scale 28 to act as stops for hand 33.

In order to avoid the necessity for providing packing around a shaft which would extend into a casing, bar 32 and the indicating hand 33 are operated by the flux from a movable magnet. To position the movable magnet in close juxtaposition to the bar 32 and support the same the following mechanism is used. A bracket 36 is provided having the upper end 37 shaped to closely fit within the tubular extension 3, the upper end 37 thus provided being forced into said extension. The lower depending portion of the bracket 36 has a tongue 38 extending from one edge thereof and bent at right angles to the bracket, said tongue having a portion 39 bent at right angles to the tongue 38. The tongue 39 is perforated to provide a bearing for a rotatable shaft 42, said shaft having a headed reduced end 43 to retain the same in position. The lower end of shaft 42 has secured thereto a segmental gear 50 whereby the shaft is rotated as described hereinafter.

The upper end of shaft 42 extends slightly beyond the cup-shaped bracket 37, and an upper bearing for the shaft is provided by a separate cup member 44. Member 44 is shaped to approximately the same size as the upper portion 37 of the bracket 36 and is frictionally retained in the portion 37. The upper edge of the cup 44 is bent over the upper edge of the bracket 36 as seen at 45, and is thus retained in position against a shoulder of the head 2 when the bracket 36 has its end 37 forced into the depending portion 3 of the head. The cup 44 is provided with a central opening having a working fit with the shaft 42 to provide a bearing for said shaft. The upper end of shaft 42 has a cross slot therein in which is seated a U-shaped magnet 46, the magnet being secured to the shaft by frictional engagement and may be soldered or brazed thereto if desirable. The upper legs of the magnet 46 extend in close proximity to the imperforate wall 5 of the well 4, the legs being cut away at an angle to accommodate the depending central portion of said wall, in which the shaft 31 is positioned.
The bracket 36 extends below the bent over tongue 38 and has an outstanding shaft 47 secured thereto upon which is mounted a sleeve 48, the sleeve being retained on the shaft by the shoulder 49 of the shaft. The sleeve 48 has secured thereto a segmental gear 51 in mesh with gear 50 on shaft 42. The gear 51 has an extended portion 52 bent around and secured to a float rod 53, the rod having a lug 53' engaging an opening in arm 52. Shaft 53 is bent at right angles and has secured to the bent end thereof a float 54 such as cork or the like. The shaft 53 extends centrally through the float and has a washer 55 on its outer end to secure the float to the shaft. From the above description of the bracket and mounting it will be seen that a simplified and cheap construction is provided, yet one which will accurately rotate the vertical shaft 42 in accordance with the position of the float 54.

It will be apparent that the magnetic strap 32 will rotate in accordance with the various positions assumed by the shaft 42 and the magnet 46 thereon. The strap 32 will remain in alignment with the U-shaped magnet 46 and will thus rotate the indicating hand 33 in accordance with the position of the magnet therefore in accordance with the position of the float 54. The operating hand 33 and the magnetic strap 32 are light in construction and offer very slight resistance to turning on the pivot shaft 31. An important feature of this invention is the fact that the parts are so arranged that the magnet 46 is positioned in close proximity to the magnetic strap 32 whereby extremely accurate indications of the level of the liquid are obtained. It will be observed that the pressure indicating mechanism comprising the Bourdon tube 16 and all operating mechanism thereof is positioned out of the flux path between the magnet 46 and the magnetic strap 32. As seen in Figure 2 the magnetic strap is closely adjacent the end of the magnet 46 without the interposition of any of the pressure indicating mechanism. Since the entire casing or head 2 is formed of non-magnetic material, it will be seen that the strap 32 will not have any appreciable lag with respect to the movements of the magnet 46, since the magnetic connection between these two parts is a close and direct one.

The head 2 used to support the operative mechanism is simple in design and cheap to manufacture and assemble. After the holes 12, 13 and 14 have been drilled in the boss 11 the Bourdon tube 16 may be slipped into the slot 15 and easily secured in position by soldering or otherwise. By positioning the magnetic strap 32 directly on the wall of the casing head 2 and having the indicator arm 33 project around the indicating plate 26, a close magnetic coupling is obtained whereby accurate registration is secured at all times and in all positions of the instrument. The bracket supporting the float operating shaft is also extremely simple in construction, the cup member 44 providing a simple form of bearing for the upper end of the shaft. The cup 44 fits the shaft 42 with a clearance of approximately .002 to .003 inch, whereby pressure applied to the liquid of the tank is enabled to pass up in the well 4 around the shaft opening through the cup member, and also through the slot between the two bent ends of the head 37.

Due to the nesting of the magnetic mechanism within the confines of the Bourdon tube, a very compact and yet accurate instrument is provided, wherein each operating mechanism and its indicator is independent of the other and each operates as freely and accurately as if the other were not present.

It is believed that the operation of the combined pressure and liquid level gauge will be obvious from the preceding description. The complete instrument may be assembled as shown in Figure 2, and may then be attached to a tank or receptacle for liquid. The length and diameter of the float 54 is such that it may be inserted through the opening provided in the receptacle for receiving the threaded bore 3 of the instrument. The bracket 36 may also be inserted through this opening whereby the entire instrument may be attached to the tank.

The threaded bore 3 is engaged in a fluid tight and pressure tight manner with the receptacle, after which the liquid may be put under operating pressure. This pressure is then indicated by the hand 24 upon the scale 27 due to movement of the Bourdon tube 16. The float 54 rises in accordance with the level of liquid, thus rotating the bushing 48 and the segmental gear 51 which rotates gear 50 and shaft 42, whereby the magnet 46 is turned in accordance with the level of the liquid. The magnetic strap 32 is thus turned correspondingly and the indicator hand 33 takes up a position on the scale 27 in accordance with the level of the liquid. The entire instrument is extremely simple in construction and thoroughly reliable in operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. A combination gauge comprising a casing having a well extending thereinto with an imperforate end wall; a rotatable magnet within said well and closely adjacent the imperforate end wall thereof; an indicating armature pivotally mounted within the casing in close proximity to said imperforate wall of the well, and thereby positioned closely adjacent the magnet for operation thereby; a Bourdon tube within said casing and surrounding said well; and a pressure indicating hand operable by said tube.

2. A combined liquid level and pressure gauge comprising a casing having a base with a well extending thereinto, and having a passageway from the well to the interior of said casing, a Bourdon tube partially encircling said well and communicating with said passageway, indicating means operable by said Bourdon tube, a float-operated magnet projecting into said well and encircled by said Bourdon tube and an indicating armature within said casing and operable by said magnet.

3. A combined liquid level and pressure gauge comprising a casing adapted to be secured to a tank, said casing having a well open at one end and designed to communicate with the interior of the tank through said open end when the casing is fitted to the tank; a Bourdon tube in said casing, said tube and said well being concentrically disposed relative to each other with the upper edge of the tube substantially in the plane of the closed end of the well; a float-operated magnet projecting into said well; an indicating hand pivoted on and disposed closely adjacent the closed end of said well within the casing and operable by said magnet; a pressure hand connected with the free end of said Bourdon tube; and a common dial having a set of indicia for each hand.

4. A combined liquid level and pressure gauge comprising a one-piece body having an integral cup-shaped member forming a well for communication with a source of fluid pressure, one side of the walls of said cup-shaped member being thickened to form an integral supporting block laterally offset from the well; a Bourdon tube surrounding said cup-shaped member between the planes of the open and closed ends of the latter and having one end anchored in said integral block; said block having a passageway formed entirely therein to establish direct communication between said well and said anchored end of the Bourdon tube; a rotatable magnet within said well, and means responsive to variations in liquid level for operating said magnet; an armature disposed adjacent the outside of the closed end of said cup-shaped member; and indicating means designed to cooperate with said armature and said Bourdon tube to render visible level and pressure readings.

MAXIMILIAN KLEIN.